United States Patent [19]
Sheren et al.

[11] Patent Number: 5,911,641
[45] Date of Patent: Jun. 15, 1999

[54] CHAIN TENSIONER AND IMPROVED PLUNGER RETENTION THEREOF

[75] Inventors: James R. Sheren, Grand Ledge; Richard L. Madden, Marshall, both of Mich.

[73] Assignee: Eaton Corporation, Cleveland, Ohio

[21] Appl. No.: 08/997,442

[22] Filed: Dec. 23, 1997

[51] Int. Cl.⁶ .............................. F16H 7/08; F16H 7/22; F16H 7/18
[52] U.S. Cl. ..................... 474/109; 474/111; 474/140
[58] Field of Search ........................ 474/109, 111, 474/101, 140, 180, 110

[56] References Cited

U.S. PATENT DOCUMENTS

| | | | |
|---|---|---|---|
| 4,826,470 | 5/1989 | Breon et al. | 474/110 |
| 5,006,095 | 4/1991 | Suzuki | 474/111 |
| 5,088,966 | 2/1992 | Suzuki et al. | 474/111 |
| 5,304,099 | 4/1994 | Deppe et al. | 474/110 |
| 5,720,684 | 2/1998 | Mott | 474/111 |
| 5,730,674 | 3/1998 | Ott | 474/111 |

*Primary Examiner*—John A. Jeffery
*Assistant Examiner*—Matthew A. Kaness
*Attorney, Agent, or Firm*—L. J. Kasper

[57] ABSTRACT

A chain tensioner (19) having a housing (23) and a plunger (29), in which the housing includes a mounting surface (39) to be in face-to-face relationship with a wall surface (35) of the engine block (E). The tensioner includes a retainer member (43;81) having a retaining portion (55;85) and a wall-engaging portion (41;87). Before assembly, the retaining portion (55;85) engages a shoulder (65) on the plunger (29) to keep it within its bore (25) When the housing (23) of the tensioner is bolted to the engine block (E), the wall-engaging portion (41;87) engages the wall surface (35), and tightening of the bolts gradually moves the retaining portion (55;85) to a position in which it no longer engages the plunger (29), thus permitting the plunger to move outward of its bore.

13 Claims, 4 Drawing Sheets

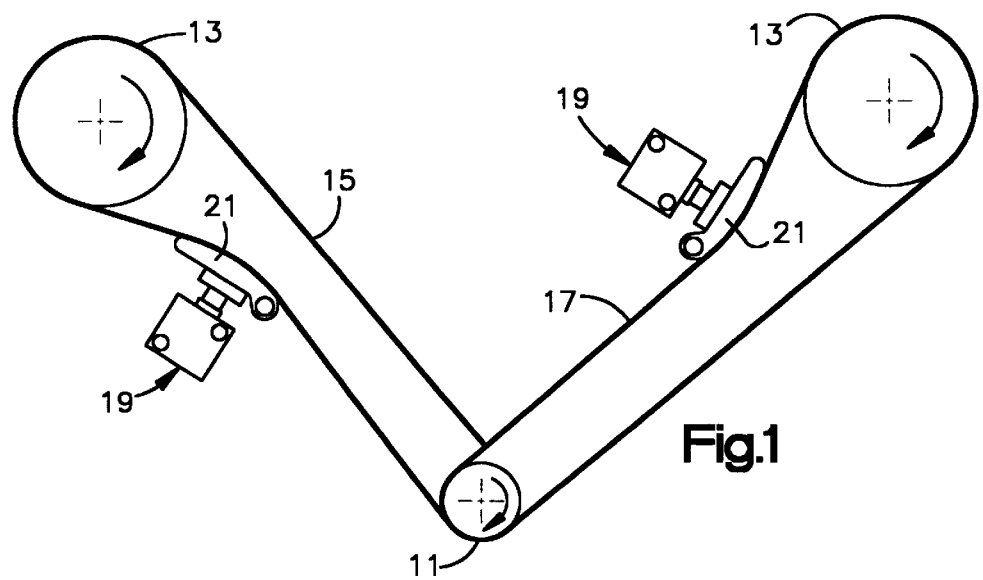
Fig.1
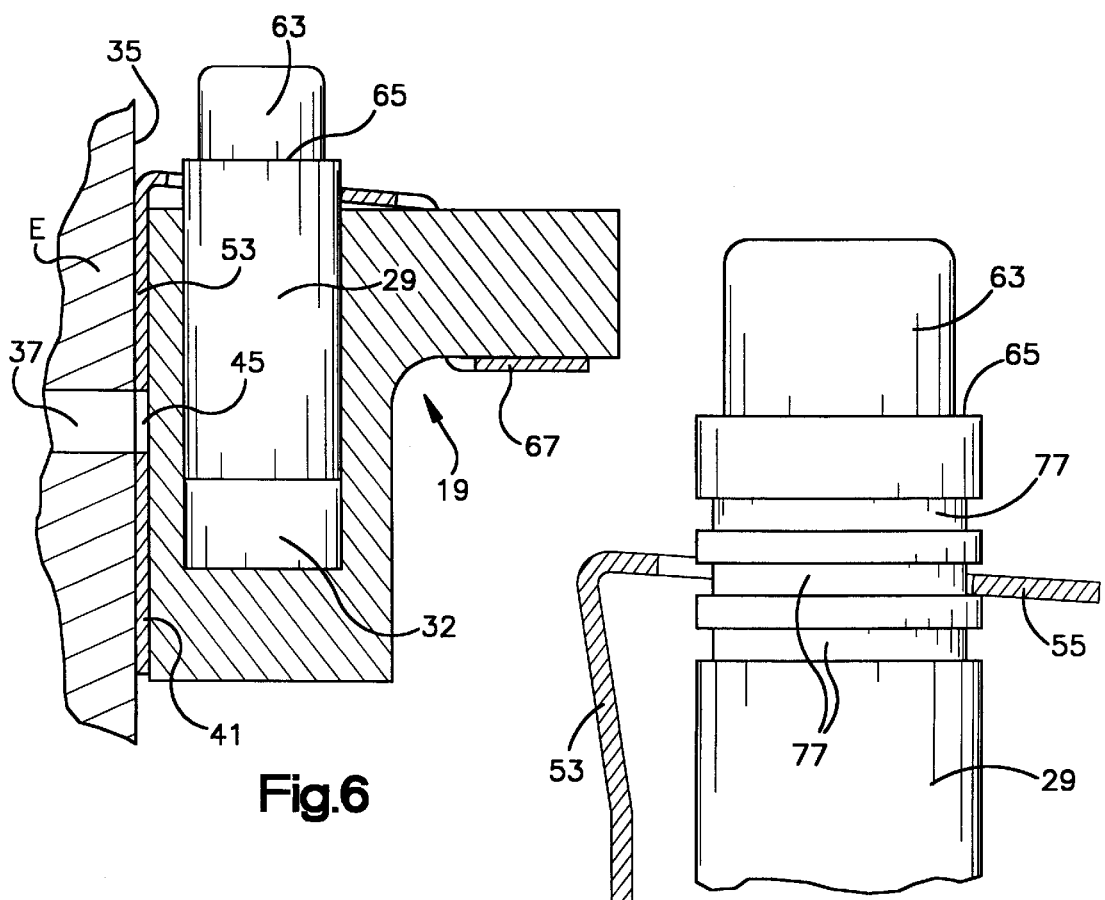
Fig.6
Fig.7

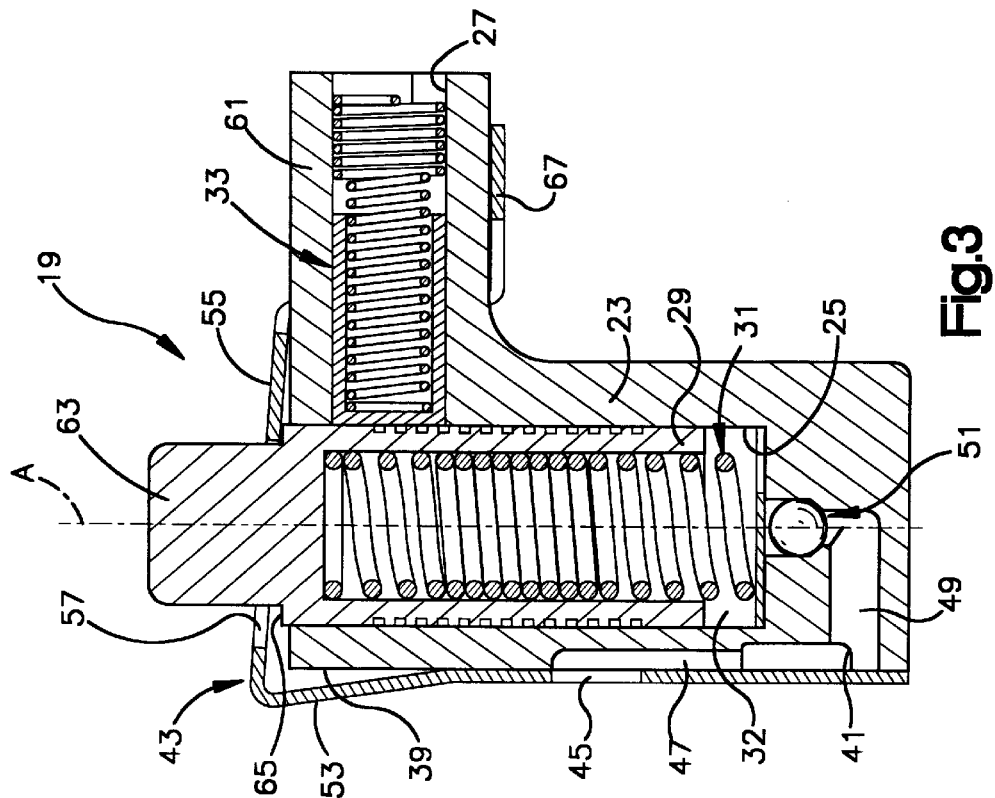
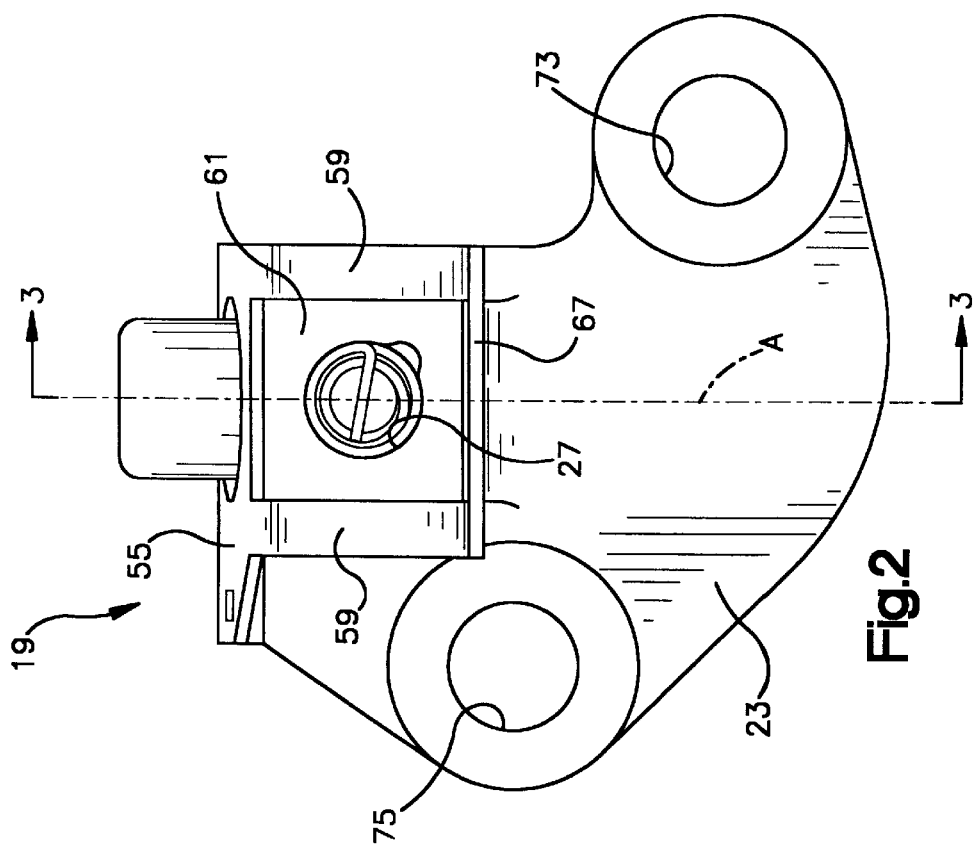

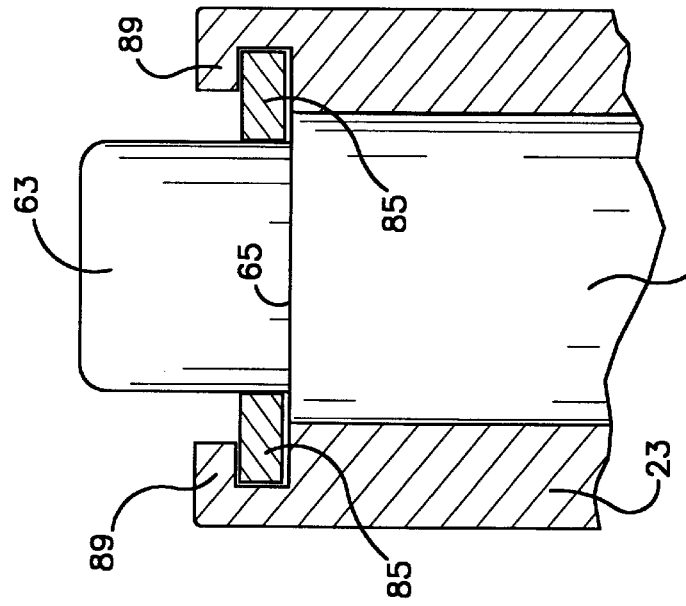
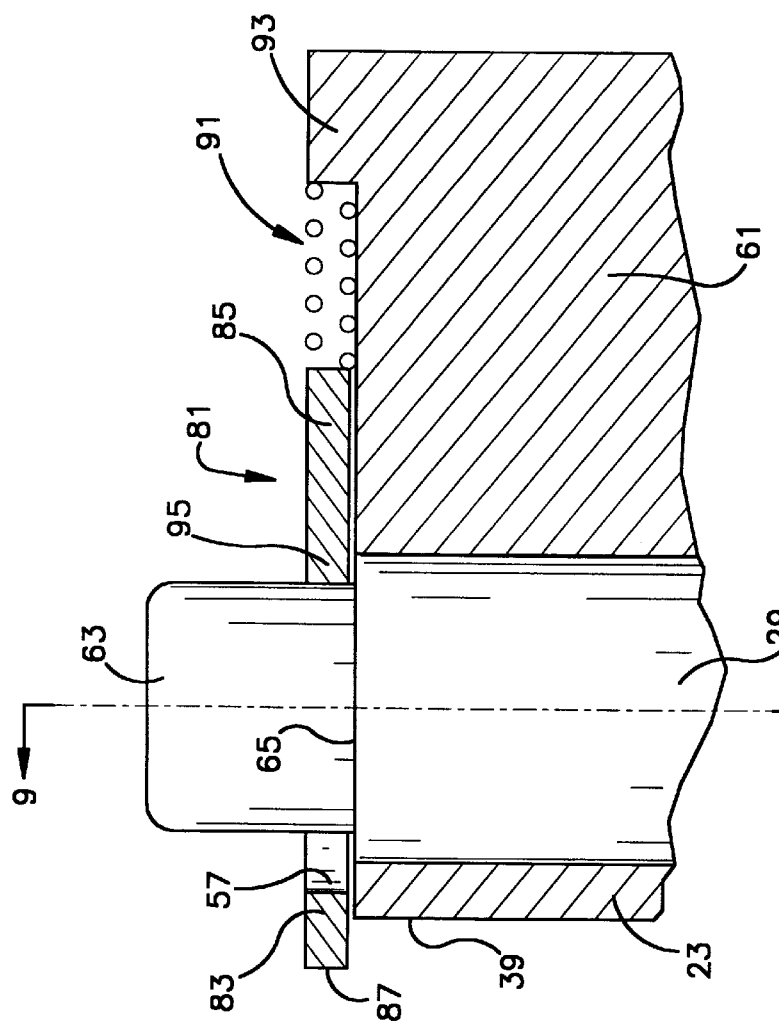

CHAIN TENSIONER AND IMPROVED PLUNGER RETENTION THEREOF

BACKGROUND OF THE DISCLOSURE

The present invention relates to chain tensioners, and more particularly, to an improved plunger retention device therefor.

Chain tensioners are now well known in the art, particularly those wherein a hydraulic plunger assembly is employed to provide a force directed against a moveable guide which bears against a timing chain of an internal combustion engine, to take up slack in the timing chain. Examples of such tensioners are shown in U.S. Pat. Nos. 4,826,470 and 5,304,099, both of which are assigned to the assignee of the present invention and are incorporated herein by reference.

Although the present invention may be used advantageously in a chain tensioner of the type in which only a spring is utilized to bias the plunger into engagement with the chain guide, the invention is especially suited for use with a hydraulic chain tensioner, and will be described in connection therewith.

In a typical hydraulic chain tensioner, an output member is biased in a protruding direction against the chain guide by the combined force of a spring and hydraulic pressure, thereby maintaining a predetermined tension in the chain. A check valve in the hydraulic circuit of the tensioner prevents retraction of the plunger under conditions wherein the force exerted on the chain guide by the timing chain exceeds the spring force.

As is well known to those skilled in the art, after assembly of the chain tensioner, it is necessary to provide some means to retain the plunger within the housing of the chain tensioner, in nearly its fully retracted condition. Unfortunately, in its fully retracted position, the plunger is subjected to the maximum force of the biasing spring, urging the plunger axially out of the plunger bore, toward its protruding position. Therefore, the means for retaining the plunger, after assembly of the tensioner, is subjected to nearly the maximum biasing force of the plunger spring.

One known method of retaining the plunger within the housing bore has been by means of a mechanism referred to generally as a "grenade pin", i.e., a pin which is put in place, passing through the tensioner housing, and holding the plunger in its retracted position until the tensioner is assembled to the engine, with the output portion of the plunger in engagement with the chain guide. At that point in the assembly process, the grenade pin is removed, and the spring biases the plunger into engagement with the chain guide.

The use of the grenade pin to retain the plunger of a typical chain tensioner has several disadvantages. First, there is the need to dispose of the pin in the engine assembly plant, after it is removed from the chain tensioner. There is also the related concern that the pin may end up somewhere in the engine where it doesn't belong. Secondly, there is always the concern about the possibility of the grenade pin being inadvertently removed while the chain tensioner is being handled, in which case the spring could propel the plunger out of the chain tensioner, which could damage the plunger, and at the very least, would require re-assembly of the tensioner by personnel not being equipped to do so. Finally, the grenade pin is adapted to retain the plunger in only one position, i.e., the fully retracted position of the plunger, whereas it is sometimes necessary to remove the chain tensioner from the engine when servicing the engine, and in those cases, it is desirable for the plunger to remain in the position it was in, so that when the tensioner is reinstalled on the engine, the same chain tension will again be applied as had been previously applied.

BRIEF SUMMARY OF THE INVENTION

Accordingly, it is an object of the present invention to provide an improved chain tensioner, and plunger retention device therefor, which overcomes the problems associated with the prior art discussed above.

It is another object of the present invention to provide an improved chain tensioner and plunger retention device which does not result in any parts being removed from the tensioner, and therefore being "left over" after the tensioner is assembled with the engine.

It is a further object of the present invention to provide a chain tensioner which accomplishes the above-stated objects, and in which the plunger is retained in such a manner that it is extremely unlikely to exit the tensioner while the tensioner is being handled.

It is finally an object of the present invention to provide a chain tensioner and plunger retention device which permits the tensioner to be removed from the engine, such as for service, wherein the position of the plunger remains as it was while the tensioner was still assembled with the engine.

The above and other objects of the invention are accomplished by the provision of a chain tensioner for use with an internal combustion engine, and adapted to be mounted against a forward wall surface of an engine block. The tensioner comprises a housing defining a bore, a plunger reciprocably disposed within the bore, the plunger including an output portion extending out of the bore and adapted for engagement with one of a chain and a chain guide. The plunger defines a stepped portion at the junction of the plunger and the output portion. Means for biasing the plunger axially outward of the bore is provided, and the tensioner includes means operable to retain the plunger within the bore.

The improved chain tensioner is characterized by the housing including a mounting surface to be disposed in face-to-face relationship with the forward wall surface of the engine block. The means operable to retain the plunger comprises a retainer member including a wall-engaging portion and a retaining portion. The retainer member includes an actuation portion disposed out of the plane of the mounting surface prior to assembly of the tensioner to the engine block. The retaining portion is operably associated with the actuation portion for movement therewith and includes an engagement portion engaging the stepped portion of the plunger and retaining the plunger within the bore when the actuation portion is out of the plane of the mounting surface. Movement of the actuation portion into the plane of the mounting surface moves the retaining portion to a position in which the engagement portion is out of engagement with the stepped portion, permitting the plunger to move axially outward of the bore.

BRIEF DESCRIPTION OF THE DRAWINGS

FIG. 1 is a somewhat schematic front plan view of an internal combustion engine illustrating the application of the invention.

FIG. 2 is a front plan view of the chain tensioner made in accordance with the present invention.

FIG. 3 is an axial cross-section taken on line 3—3 of FIG. 2, and on the same scale, illustrating the chain tensioner out of its assembled position.

FIG. 6 is a fragmentary, somewhat simplified axial cross-section of the present invention, after assembly to the engine.

FIG. 7 is an enlarged, fragmentary view of the retainer and plunger of the present invention, illustrating a further aspect of the invention.

FIG. 8 is an enlarged, fragmentary, somewhat simplified axial cross-section of an alternative embodiment of the present invention.

FIG. 9 is an enlarged, fragmentary, somewhat simplified transverse cross-section, taken on line 9—9 of FIG. 8, and on the same scale.

DETAILED DESCRIPTION OF THE PREFERRED EMBODIMENT

Figure 5:
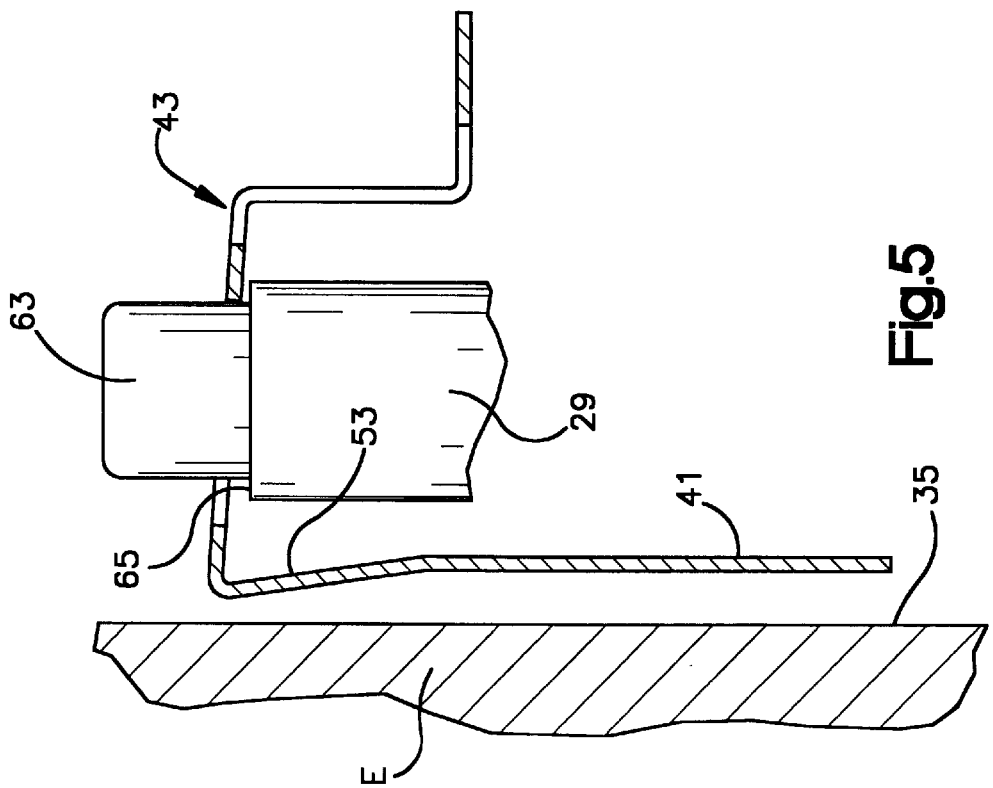
FIG. 5 is a somewhat schematic axial cross-section of the retainer and plunger of the present invention, prior to assembly to the engine.

Referring now to the drawings, which are not intended to limit the invention, FIG. 1 illustrates a vehicular engine application for which the chain tensioner of the present invention can be utilized. FIG. 1 shows an engine crankshaft 11 driving a pair of spaced-apart camshafts 13 by means of belts or roller chains 15 and 17. As is well known to those skilled in the art, because the crankshaft 11 and the camshafts 13 are normally fixed in terms of their locations, it is likely that the roller chains 15 and 17 will loosen after a period of time due to stretching and wear of either the chain or the sprockets employed with the roller chain.

Although the present invention will be described as a "chain tensioner", for use with a roller chain driven by sprockets, it should be understood that those terms, as used hereinafter and in the appended claims may mean and include various types of belts and sheaves.

In order to impart and maintain tension on the chains 15 and 17, two tensioning devices, generally designated 19, are employed in two different orientations relative to a horizontal plane. In a manner which is generally well known to those skilled in the art, each tensioning device ("chain tensioner") 19 engages a chain guide 21 which, in turn, is in engagement with its respective chain 15 or 17. Although the present invention is illustrated in FIG. 1 in a system wherein each tensioner 19 engages a chain guide 21, those skilled in the art will understand that the invention is not so limited, and the tensioner 19 may, within the scope of the present invention, engage either a guide or the chain itself Referring now primarily to FIGS. 2 and 3, the chain tensioner 19 of the present invention will be described in detail. The chain tensioner 19 comprises a housing 23 defining a blind bore 25, and another, smaller diameter bore 27, which is disposed generally at right angles to, and intersects the blind bore 25. Disposed within the blind bore 25 is a plunger 29 which is biased outwardly of the blind bore 25 (up in FIG. 3) by a helical compression spring 31, in a manner well known to those skilled in the art. The plunger 29 cooperates with the bore 25 to define a fluid pressure chamber 32, the function of which will be described subsequently.

Disposed within the bore 27 is a ratchet assembly, generally designated 33, the construction and function of which may be better understood by reference to above-incorporated U.S. Pat. No. 5,304,099. Briefly, the function of the ratchet assembly 33 is to engage the plunger 29 and maintain the then-current position of the plunger 29 in the absence of fluid pressure in the blind bore 25, which pressure would urge the plunger 29 in its outward direction.

Referring briefly to FIG. 6, it may be seen that the chain tensioner 19 is intended to be mounted against a forward wall surface 35 of an engine block E. Typically, the engine block E defines an oil passage 37, which is in communication with a source of pressurized oil, such as the engine oil pump (not shown).

Referring again primarily to FIG. 3, the housing 23 includes a mounting surface 39. When the chain tensioner 19 is in the assembled position shown in FIG. 6, the mounting surface 39 is in a generally face-to-face relationship with the forward wall surface 35 of the engine block E. disposed between the wall surface 35 and the mounting surface 39 is a wall-engaging portion 41 of a plunger retainer member, generally designated 43, which will be described in greater detail subsequently.

The wall-engaging portion 41 defines an oil opening 45 which permits the passage of oil from the oil passage 37 into a generally vertical oil passage 47 defined by the housing 23. The oil passage 47 communicates with a horizontal oil passage 49 which, in turn, communicates with a vertical passage, opening into the blind bore 25, within which is disposed a ball check valve 51. As is well known to those skilled in the art, the function of the elements just described is to permit the communication of pressurized oil from the source within the engine into the fluid pressure chamber 32 to exert a biasing force, in addition to that of the spring 31, urging the plunger 29 outwardly of its bore and into engagement with its respective chain guide 21. In addition, the presence of the ball check valve 51 ensures that the plunger 29 will not "collapse" (i.e., retract into the bore 25), whenever the chain exerts a force on the plunger 29 which is greater than the combined force of the oil pressure and the spring.

Figure 4:
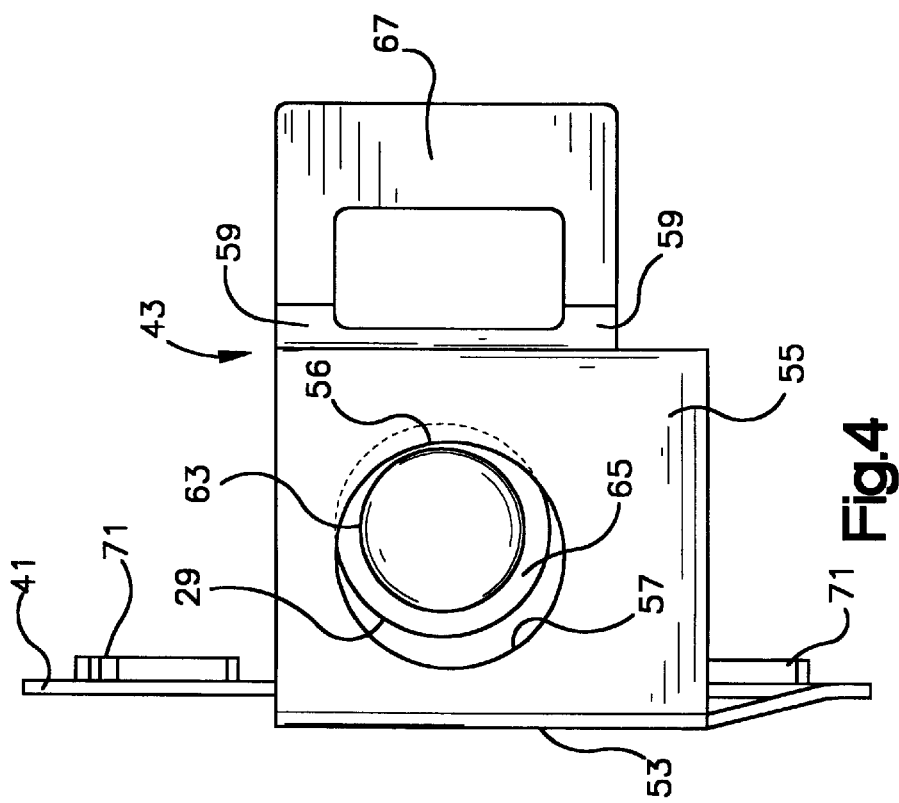
FIG. 4 is a somewhat simplified, top plan view of the retainer and plunger of the present invention in its position prior to assembly to the engine.

Referring now primarily to FIGS. 4 and 5, in conjunction with FIGS. 2 and 3, the present invention will be described in greater detail. The plunger retainer member 43 is preferably a single, unitary member which, in the subject embodiment and by way of example only, comprises a stamped steel member. With the retainer member 43 in its "disassembled" condition (i.e., its condition prior to assembly to the engine block E), the retainer member 43 has the shape illustrated in FIGS. 3, 4 and 5. In this position, the wall-engaging portion 41 is in engagement with the mounting surface 39, as shown in FIG. 3, but an actuation portion 53 deviates from the plane of the surface 39 and portion 41, as best shown in FIG. 3. Attached to the generally vertical actuation portion 53 is a retaining portion 55 defining a generally circular opening 57, and including an engagement portion 56, disposed just to the right of the opening 57, in FIG. 4. Integral with the retaining portion 55 is a pair of arms 59 defining an opening through which extends a generally square cross-section portion 61 of the housing 23. It is the portion 61 which defines the bore 27. One function of the arms 59 being disposed on either side of the housing portion 61 is to help locate the retainer member 43 relative to the housing 23.

In the subject embodiment, the plunger 29 includes an output portion 63 which is adapted for engagement with the chain guide 21. The junction of the plunger 29 and the output portions 63 defines a shoulder or step 65, the function of which will be described subsequently.

Referring now primarily to FIGS. 3, 4 and 5, when the chain tensioner 19 is assembled, but before it is assembled to the engine block E, the plunger 29 and the retainer member 43 are in the positions illustrated in FIGS. 3 through 5, representing the fully retracted position of the plunger 29. In this retracted position, with the actuation portion 53 in its position shown in FIGS. 3 through 5, the axis of the circular opening 57 is offset relative to an axis A of the plunger 29, and the engagement portion 56 of the retaining portion 55 engages the shoulder 65 of the plunger 29 and maintains it in its fully retracted position as shown. In view of the outward (upward in FIG. 3) force being exerted by the plunger shoulder against the retaining portion 55, it is preferred that the retainer member 43 include a solid stop portion 67. The stop portion 67 engages the underside of the housing portion 61, thus limiting upward movement of the retaining portion 55.

As may best be seen in FIG. 4, the wall-engaging portion 41 of the retainer member 43 preferably includes two groups of tabs 71 which, during the stamping process, are deformed out of the plane of the wall-engaging portion 41 to define a pair of circular openings (not shown) which are aligned with circular bores 73 and 75 defined by the housing 23. The groups of tabs 71 are disposed within the bores 73 and 75, adjacent the mounting surface 39, to help maintain the retainer member 43 in its position relative to the housing 23 as shown in FIGS. 2 and 3.

When the entire chain tensioner 19 is to be assembled to the engine block E, the tensioner is put in a position represented by FIG. 5, with the wall-engaging portion 41 disposed near the forward wall surface 35 of the engine block E. Suitable fastening means, such as a pair of bolts (not shown herein) are then inserted through the bores 73 and 75 and into threaded engagement with mating, threaded bores (not shown) in the engine block E. The next step is to then begin tightening the bolts, which will result in the tensioner 19 being drawn closer to the forward wall surface 35 until the actuation portion 53 engages the wall surface 35.

It will be understood by those skilled in the art that, at this point in the assembly process, the output portion 63 of the plunger 29 is disposed adjacent the respective chain guide 21. As the bolts are tightened, the mounting surface 39 of the housing 23 is gradually drawn into the face-to-face relationship with the forward wall surface 35, which begins to move the actuation portion 53 toward the plane of the surface 39 and portion 41. When the bolts are fully tightened, the tensioner 19 is in the assembled position shown in FIG. 6, with the actuation portion 53 now lying in the plane of the mounting surface 39. This movement of the actuation portion 53 in turn moves the retaining portion 55 from its original position shown in FIGS. 3 through 5 to the right, to the position shown in FIG. 6. In the fully assembled position of FIG. 6, the opening 57, defined by the retaining portion 55, is now substantially coincidental with the axis of the plunger 29. Thus, the retaining portion 55 no longer engages the shoulder 65, and the plunger 29 is free to move outward of its blind bore 25, under the influence of the biasing spring 31 to a protruding or extended position as shown in FIG. 6. It should be noted in regard to FIG. 6 that the plunger 29 is shown only partially protruding, based upon the assumption that it would be in engagement with its respective chain guide 21.

Although not an essential of the present invention, it is preferable that the plunger 29 define a plurality of circumferential grooves 77 about the outside diameter of the plunger 29. In the event of a substantial amount of wear of various of the system components, the plunger 29 will move further outward of its bore 25 over a period of time. If and when it becomes necessary to service the chain tensioner 19, it can be removed by simply unbolting it from the engine block E, and the retainer member 43 will return to the position illustrated in FIGS. 3 and 7, with the actuation portion 53 again deviating from the plane of the mounting surface 39. As this occurs, the opening 57 defined by the retaining portion 55 will again become offset from the axis of the plunger 29, until the retaining portion 55 engages one of the grooves 77. Thus, after the chain tensioner 19 is removed from the engine, the plunger 29 is maintained in the position it was in just prior to disassembly, and after the tensioner is serviced, it may be reinstalled, and, without any manual adjustment being required, the amount of chain tension applied to the chain will again be the same as just before removal of the tensioner for service.

Alternative Embodiment

Referring now primarily to FIGS. 8 and 9, an alternative embodiment of the present invention will be described, with like elements bearing like numerals, and new or substantially modified elements bearing numerals in excess of "80". In those applications where the wall-engaging portion 41 is not required to cover substantially all of the mounting surface 39, a simpler, modified form of the invention may be utilized. In FIGS. 8 and 9 there is shown a retainer member, generally designated 81, including an actuation portion 83 and a retaining portion 85. With the retainer member 81 out of its assembled position in FIG. 8 (similar to FIG. 3), the actuation portion 83 extends past the mounting surface 39, and includes a forward surface 87 which comprises the "wall-engaging portion", as will become apparent subsequently.

As may best be seen in FIG. 9, the housing 23 includes a pair of generally L-shaped channels 89 which restrain movement of the retainer member 81 so that it can move only along a path into and out of the plane of FIG. 9, or parallel to the plane of FIG. 8. At the rearward end (right end in FIG. 8) of the retainer member 81 there is a compression spring 91, seated against a seat portion 93, which is preferably integral with the housing portion 61. The function of the spring 91 is to bias the retainer member 81 toward its "out of assembly" position shown in FIG. 8, in which an engagement portion 95 of the retainer member 81 engages the shoulder 65 of the plunger 29. It should be noted that the alternative embodiment does not require any modification of the plunger 29, but only of the housing 23 and retainer member 81.

The assembly process is substantially identical to that described previously for the main embodiment. As the tensioner 19 is bolted to the engine block E, the forward surface 87 engages the forward wall surface 35, and as the bolts are tightened, the retainer member 81 is forced to the right in FIG. 8, in opposition to the biasing force of the spring 91. When the surfaces 35 and 39 are face-to-face, the retainer member 81 is moved to a position in which the opening 57 is concentric with the plunger 29, and the engagement portion 95 is no longer engaging the shoulder 65. The plunger is then free to extend outwardly as described previously.

Although the retainer member 81 is shown as being fairly thick in FIGS. 8 and 9, for ease of illustration, those skilled in the art will recognize that the retainer member 81 can be used to maintain a fixed, axial position of the plunger 29, in the same manner shown in FIG. 7, by engaging circumferential grooves defined by the plunger 29.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

We claim:

1. A chain tensioner for use with an internal combustion engine, and adapted to be mounted against a forward wall surface of an engine block, said tensioner comprising a housing defining a bore, a plunger reciprocably disposed within said bore, said plunger including an output portion extending out of said bore and adapted for engagement with one of a chain and a chain guide, said plunger defining a stepped portion at the junction of said plunger and said output portion; means biasing said plunger axially outward of said bore, and means operable to retain said plunger within said bore, characterized by:

(a) said housing including a mounting surface to be disposed in face-to-face relationship with said forward wall surface of said engine block;

(b) said means operable to retain said plunger comprises a retainer member including a wall-engaging portion and a retaining portion;

(c) said retainer member includes an actuation portion disposed out of the plane of said mounting surface prior to assembly of said tensioner to said engine block;

(d) said retaining portion is operably associated with said actuation portion for movement therewith and includes an engagement portion engaging said stepped portion of said plunger, and retaining said plunger within said bore, when said actuation portion is out of said plane of said mounting surface; and (e) movement of said actuation portion into said plane of said mounting surface moving said retaining portion to a position in which said engagement portion is out of engagement with said stepped portion, permitting said plunger to move axially outward of said bore.

2. A chain tensioner as claimed in claim 1, characterized by said plunger defining an axis of movement within said bore, and said mounting surface being generally parallel to said axis.

3. A chain tensioner as claimed in claim 2, characterized by said retainer member being generally L-shaped, with said wall-engaging portion being adapted to be disposed between said mounting surface of said housing and said forward wall surface, and said wall-engaging portion and said retaining portion being generally perpendicular to each other.

4. A chain tensioner as claimed in claim 3, characterized by said actuation portion of said retainer member is generally planar, and cooperates with said plane of said mounting surface to define an acute angle when said chain tensioner is out of its assembled position.

5. A chain tensioner as claimed in claim 1, characterized by said retaining portion defining an opening at least slightly larger than said plunger, said opening defining an axis offset from said axis of said plunger when said chain tensioner is out of its assembled position.

6. A chain tensioner as claimed in claim 5, characterized by a portion of said retaining portion, adjacent said opening, oppositely disposed from said actuation portion, comprises said engagement portion.

7. A chain tensioner as claimed in claim 1, characterized by said plunger defines a plurality of retention surfaces disposed along the axial length of said plunger, said engagement portion being operable to engage one of said retention surfaces to maintain a fixed axial position of said plunger when said actuation portion is permitted to move out of said plane of said mounting surface.

8. A chain tensioner as claimed in claim 7, characterized by said plurality of retention surfaces are defined by a plurality of annular grooves formed about the outer cylindrical surface of said plunger.

9. A chain tensioner as claimed in claim 8, characterized by said housing defining a second bore, disposed generally perpendicular to said plunger bore, and in open communication therewith, said second bore having disposed therein a latching mechanism operable to engage one of said retention surfaces, to maintain a fixed axial position of said plunger when said tensioner is in its assembled position.

10. A chain tensioner as claimed in claim 9, characterized by said plunger and said bore cooperating to define a fluid pressure chamber in open communication with a source of pressurized fluid, pressurized fluid in said fluid pressure chamber being operable to bias said plunger axially outward of said bore, said latching mechanism being operable to maintain said fixed axial position of said plunger in the absence of pressurized fluid in said fluid pressure chamber.

11. A chain tensioner as claimed in claim 10, characterized by said forward wall surface of said engine block defines a fluid chamber, said source of pressurized fluid comprises said fluid chamber, said housing of said chain tensioner defines a fluid passage in communication with said fluid pressure chamber, and said wall-engaging portion of said retainer member defines an opening permitting fluid communication between said fluid chamber in said engine block and said fluid passage defined by said housing.

12. A chain tensioner as claimed in claim 1, characterized by said retainer member comprises a generally flat member including a forward surface comprising said wall-engaging portion, and including means biasing said flat member toward said position in which said actuation portion is out of said plane of said mounting surface.

13. A chain tensioner as claimed in claim 1, characterized by said housing includes means operable to restrain said retainer member relative to said housing, for movement only between said position in which said actuation portion is out of said plane of said mounting surface and said position in which said actuation portion is in said plane of said mounting surface.

* * * * *